(12) United States Patent
Hughes et al.

(10) Patent No.: US 7,972,546 B1
(45) Date of Patent: Jul. 5, 2011

(54) LAYERED COMPOSITES

(75) Inventors: Roderick E. Hughes, Newport Beach, CA (US); Kevin Fidati, Fayetteville, GA (US); Joe Schiff, Peachtree City, GA (US); Jack Cuttle, Fairburn, GA (US); George Vuduris, Peachtree City, GA (US)

(73) Assignee: Tamko Building Products, Inc., Joplin, MO (US)

(*) Notice: Subject to any disclaimer, the term of this patent is extended or adjusted under 35 U.S.C. 154(b) by 0 days.

(21) Appl. No.: 12/221,609

(22) Filed: Aug. 4, 2008

Related U.S. Application Data

(63) Continuation of application No. 10/465,521, filed on Jun. 19, 2003, now Pat. No. 7,421,830.

(60) Provisional application No. 60/413,214, filed on Sep. 24, 2002.

(51) Int. Cl.
 B29C 47/00 (2006.01)
 B29C 63/06 (2006.01)
 B29C 47/06 (2006.01)
 E04C 2/54 (2006.01)

(52) U.S. Cl. ...... 264/148; 264/45.9; 264/46.1; 264/151; 264/171.27; 264/173.12; 264/173.16; 264/209.4; 52/783.1

(58) Field of Classification Search .................. None
See application file for complete search history.

(56) References Cited

U.S. PATENT DOCUMENTS

| | | | |
|---|---|---|---|
| 3,041,719 A | 5/1959 | Haseltine | |
| 3,489,392 A | 1/1970 | Thorn | |
| 3,554,494 A | 1/1971 | Bee | |
| 3,944,631 A | 3/1976 | Yu et al. | |
| 4,151,226 A | 4/1979 | Morinaga et al. | |
| 4,181,764 A | 1/1980 | Totten | |
| 4,208,175 A | 6/1980 | Rosenbaum | |
| 4,249,875 A | 2/1981 | Hart et al. | |
| 4,453,357 A | 6/1984 | Zwilgmeyer | |
| 4,514,449 A | 4/1985 | Budich et al. | |
| 4,517,339 A | 5/1985 | Aliberto et al. | |
| 4,610,902 A | 9/1986 | Eastman et al. | |
| 4,649,007 A * | 3/1987 | Bonis et al. | 264/148 |
| 4,652,325 A * | 3/1987 | Benge et al. | 156/244.11 |
| 4,731,414 A | 3/1988 | Ting | |
| 4,746,688 A | 5/1988 | Bistak et al. | |
| 4,831,079 A | 5/1989 | Ting | |
| 4,842,791 A * | 6/1989 | Gould et al. | 264/173.13 |
| 4,911,628 A * | 3/1990 | Heilmayr et al. | 425/131.1 |
| 4,942,084 A | 7/1990 | Prince | |
| 4,961,977 A | 10/1990 | Archer et al. | |
| 4,964,618 A | 10/1990 | Kennedy et al. | |

(Continued)

OTHER PUBLICATIONS

USPTO Office Action dated Aug. 9, 2005 in related U.S. Appl. No. 10/465,521, filed Jun. 19, 2003, now U.S. Patent 7,421,830 B1.

(Continued)

*Primary Examiner* — Jeffrey Wollschlager
(74) *Attorney, Agent, or Firm* — Stout, Uxa, Buyan & Mullins; Carlos A. Fisher

(57) ABSTRACT

Useful composites and methods of using such composites are provided. The composites include an outer layer containing a first polymeric material, an intermediate layer circumscribed by the outer layer and containing a second polymeric material, and an inner layer circumscribed by the intermediate layer and containing a third polymeric material. The inner layer, in combination with the intermediate layer, is structured and effective to reinforce the composite relative to a substantially identical composite without the inner layer. The present composites can be produced using co-extrusion processing.

13 Claims, 9 Drawing Sheets

U.S. PATENT DOCUMENTS

| | | |
|---|---|---|
| 4,972,537 A | 11/1990 | Slaw, Sr. |
| 5,077,948 A | 1/1992 | Olson et al. |
| 5,100,109 A | 3/1992 | Robbins, III |
| 5,119,871 A | 6/1992 | Schwaegerle |
| 5,121,785 A | 6/1992 | Ohsumi |
| 5,236,642 A * | 8/1993 | Blemberg et al. ............ 264/40.7 |
| 5,329,741 A | 7/1994 | Nicolaidis et al. |
| 5,393,536 A * | 2/1995 | Brandt et al. ................. 425/112 |
| 5,404,685 A | 4/1995 | Collins |
| 5,416,139 A | 5/1995 | Zeiszler |
| 5,418,028 A | 5/1995 | DeWitt |
| 5,437,899 A | 8/1995 | Quigley |
| 5,486,553 A | 1/1996 | Deaner et al. |
| 5,706,620 A | 1/1998 | De Zen |
| 5,743,986 A | 4/1998 | Colombo |
| 5,847,016 A | 12/1998 | Cope |
| 5,851,609 A | 12/1998 | Baratuci et al. |
| 5,858,493 A | 1/1999 | Sandt |
| 5,883,191 A | 3/1999 | Hughes |
| D409,869 S | 5/1999 | Marusak |
| 5,953,878 A | 9/1999 | Johnson |
| 5,996,672 A | 12/1999 | Kotin |
| 6,039,307 A | 3/2000 | De Zen |
| 6,054,207 A | 4/2000 | Finley |
| D426,320 S | 6/2000 | Andres |
| 6,083,601 A | 7/2000 | Prince et al. |
| 6,133,349 A | 10/2000 | Hughes |
| 6,276,915 B1 * | 8/2001 | Merziger et al. ........... 425/133.1 |
| 6,344,268 B1 | 2/2002 | Stucky et al. |
| D461,914 S | 8/2002 | Hughes et al. |
| D462,458 S | 9/2002 | Hughes et al. |
| 6,448,332 B1 | 9/2002 | Hughes |
| 6,451,882 B1 | 9/2002 | Hughes |
| 6,505,454 B2 | 1/2003 | Dingler |
| 6,579,605 B2 * | 6/2003 | Zehner ....................... 428/319.9 |

OTHER PUBLICATIONS

USPTO Office Action dated Feb. 13, 2006 in related U.S. Appl. No. 10/465,521, filed Jun. 19, 2003, now U.S. Patent 7,421,830 B1.

USPTO Office Action dated Aug. 24, 2006 in related U.S. Appl. No. 10/465,521, filed Jun. 19, 2003, now U.S. Patent 7,421,830 B1.

USPTO Office Action dated Oct. 15, 2007 in related U.S. Appl. No. 10/465,521, filed Jun. 19, 2003, now U.S. Patent 7,421,830 B1.

* cited by examiner

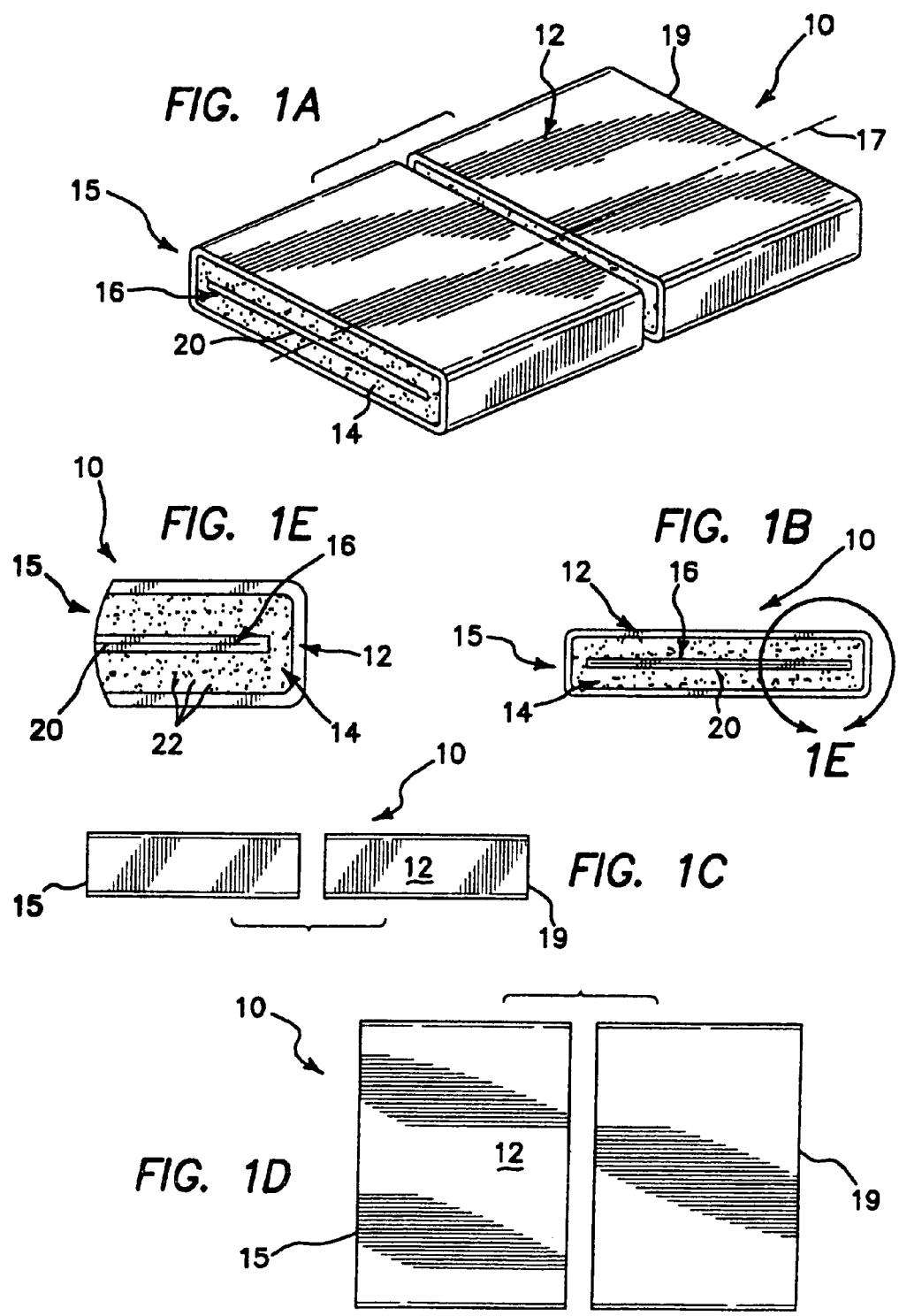

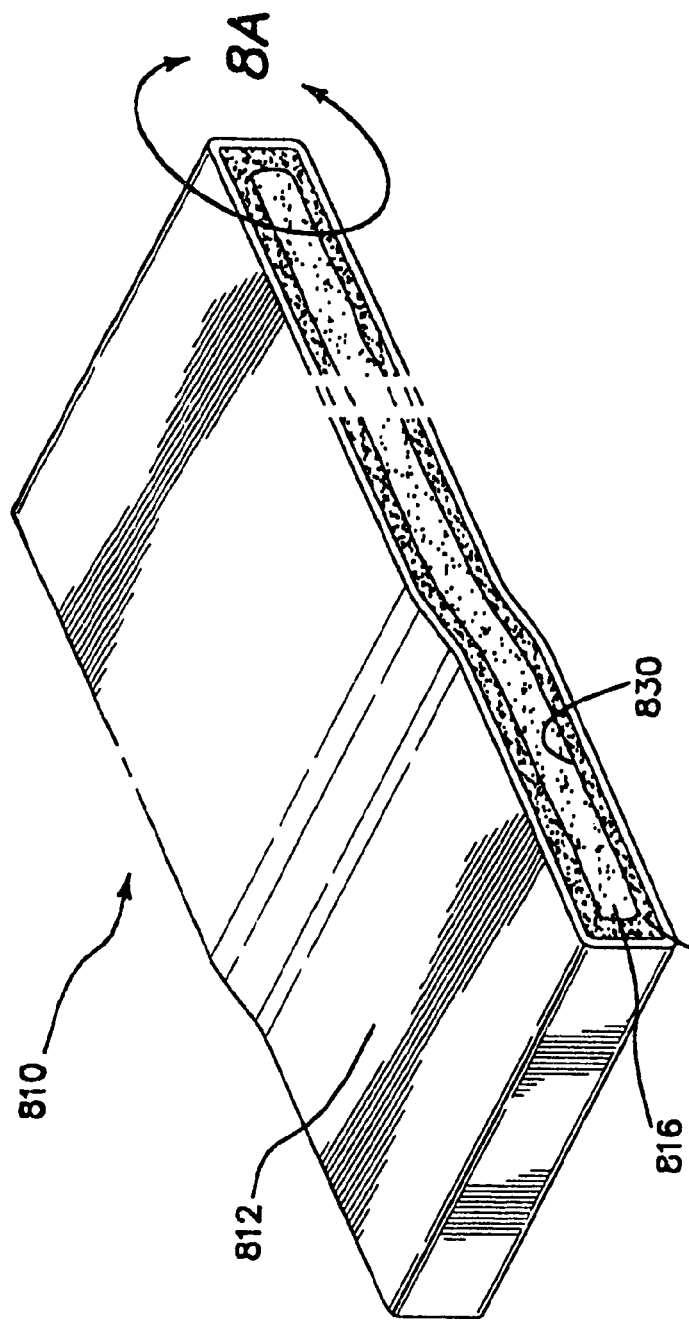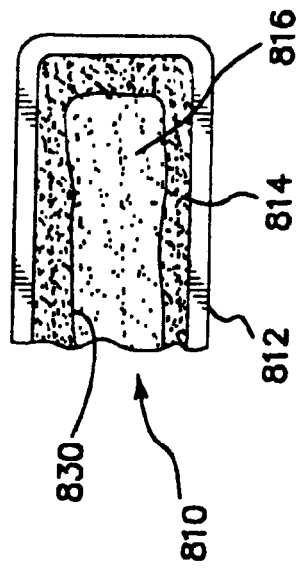

LAYERED COMPOSITES

RELATED APPLICATIONS

This application claims the benefit of U.S. Provisional Application Ser. No. 60/413,214, filed Sep. 24, 2002, and U.S. patent application Ser. No. 10/465,521, filed Jun. 19, 2003 the disclosure of each of which is hereby incorporated in its entirety herein by reference.

BACKGROUND OF THE INVENTION

The present invention generally relates to composites and more specifically relates to layered composites useful as fence components, decking components, siding components, paneling components, window blind slats, architectural molding components, and the like, and methods for producing same.

Conventional industrial, commercial and residential architecture and interior design commonly involve the use of structural and nonstructural components in the assembly of useful units. Components such as wall paneling, residential siding and the like, are traditionally made from wood or metal. Interior design components, for example, window coverings, such as vertical or "Venetian" blinds, traditionally comprise slats made of wood, metal or plastics.

Wood, lumber, trim, post, beam and assembled units comprising wood for example, solid wood components have obvious utility and are well adapted for many uses in residential or commercial installations. Shaping wood components typically involves milling, which due to natural variances found in wood, does not always produce consistent results in the final product. In addition, components formed of solid wood can deteriorate due to the effect of fungus, mildew, and insect attack. Further, wood members also require substantial upkeep comprising painting or staining. Metal, typically aluminum or steel, components are also often used in industrial, commercial and residential construction but are relatively costly, and can suffer from rust or corrosion problems. Molded plastic components can be produced quite inexpensively and with consistent results, but do not always provide the desired appearance or required strength necessary for many applications.

There still remains a need in the market today for inexpensive, lightweight composites useful as components in architectural and design components that are consistent in form and quality, durable, attractive, versatile and inexpensive to manufacture using simple manufacturing techniques.

SUMMARY OF THE INVENTION

New composites, for example, useful as fence components, decking components, siding components, paneling components, window blind slats, architectural molding components, and the like, as well as methods for producing same have been discovered. The composites are easy to manufacture in a variety of configurations with various cross-sectional shapes using relatively inexpensive materials. In addition, the composites are sturdy, lightweight and preferably have excellent weatherability properties. The composites have many of the desirable properties of natural wood products, with the consistency of molded plastics. For example, the composites can be made to have a wood-like look and texture. However, unlike solid wood components, the composites of the present invention preferably are highly resistant to effects of weathering.

In a broad aspect of the invention, a layered composite is provided, which can be formed, for example, as an architectural or design component.

The present composites, in general, comprise an outer layer comprising a first polymeric material; an intermediate layer, circumscribed by the outer layer and comprising a second polymeric material; and an inner layer, circumscribed by the intermediate layer and comprising a third polymeric material. The inner layer, in combination with the intermediate layer, is effective to reinforce the composite relative to a substantially identical composite without the inner layer. In one embodiment, the inner layer defines a reinforcement element, for example a substantially solid reinforcement element.

In another useful embodiment, the inner layer comprises a foam, for example, an inner foam containing the third polymeric material. In this embodiment, the intermediate layer advantageously comprises an intermediate foam containing the second polymeric material. The present composites including one or more foam layers are advantageously light weight, for example, relative to similar composites with one or more solid layers in place of the one or more foam layers. Importantly, such composites with one or more, and preferably two, foam layers have been found to have sufficient strength and/or to be sufficiently reinforced to be suitable for use in members for many applications, for example, applications as set forth elsewhere herein.

Advantageously, the present composites do not define a hollow central region. Preferably, the composites of the present invention are in the form of a member having a length defined along a longitudinal axis of the member. The inner layer, preferably extends along substantially the entire length, of the member. The intermediate layer preferably is substantially completely circumscribed by the outer layer along substantially the entire length of the member and/or the inner layer preferably is substantially completely circumscribed by the intermediate layer. The member may have any suitable axial cross-section, such as circular, square rectangular, polygonal, oval, an irregularly shaped cross-section and the like.

In one useful embodiment, the composite has a substantially rectangular cross-section and forms, for example, an elongated rectangular slat useful for many applications, such as those mentioned elsewhere herein.

Each one of the first, second and third polymeric materials of the composite layers preferably comprises a thermoplastic polymeric material. In some embodiments of the invention, at least two or all three of the first, second and third polymeric materials have different chemical compositions.

Preferably, the outer layer is made of a weatherable, thermoplastic polymeric material. The outer layer advantageously is substantially solid and water resistant. As used herein, the term "weatherable" refers to the ability or property of a material to effectively withstand the conditions of an out-of-doors environment for a long period of time, for example, at least about five years and preferably at least about seven years or longer. Specific examples of polymers which can be used as the outer layer include, without limitation, polyvinylchloride, acrylonitrile/styrene/acrylic polymeric materials, and the like and mixtures or combinations thereof.

Preferably, the second polymeric material comprises a solid thermoplastic polymeric material or a thermoplastic polymeric material foam or combinations thereof. Advantageously, an effective amount of a filler component is included in the second polymeric material or the intermediate layer.

The intermediate layer may comprise a foam material, for example, a foam material having a substantially closed cell structure. Suitable polymeric materials for the intermediate layer include, without limitation, polyvinylchloride, acrylonitrile/styrene/acrylic polymeric materials, acrylonitrile/butadiene/styrene polymeric materials, and the like and mixtures or combinations thereof.

The inner layer is circumscribed by the second layer and, in combination with the second or intermediate layer, is effective to reinforce the composite. In one embodiment, the inner layer defines a reinforcement member of the composite. The inner layer comprises a thermoplastic polymeric material which need not be weatherable. Preferably, if the inner layer is a solid layer, the thermoplastic polymeric material is effectively impact resistant and/or has a high stiffness modulus. In one embodiment, the inner layer is preferably substantially solid and generally includes no cells or hollow cavities. In some embodiments of the invention, the reinforcement element includes a cross-section having a shape that appears as a collapsed annulus.

In a useful embodiment, the inner layer comprises a foam, or foam material such as a foam comprising the third polymeric material. Such foam material may comprise a foam material having a closed cell structure.

Examples of materials that are suitable as the third polymeric material include, without limitation, filled, e.g., wood-filled, polymeric materials, such as polyvinylchloride and acrylonitrile/butadiene/styrene polymeric materials and the like thermoplastic polymeric materials, unfilled polymeric materials, such as polyvinylchloride and acrylonitrile/butadiene/styrene polymeric materials and the like thermoplastic polymeric materials, and the like and mixtures or combinations thereof.

The junction between the intermediate layer and the inner layer occurs at an innerface between these two layers. This innerface can be relatively or substantially uniform or regular, for example, substantially smooth. Alternatively, the innerface can be substantially irregular or jagged or non-uniform. It has been found that providing a relatively irregular configured interface between the intermediate layer and the inner layer effectively enhances the strength or reinforcement of the composite, for example, relative to a substantially identical composite with a uniform or regular interface between the intermediate layer and the inner layer. This effect is particularly apparent and useful with both the intermediate layer and the inner layer comprising foam materials.

Any suitable filler component may be present in any of the layers of the present composites. Such filler component or components preferably are effective to add bulk and/or strength and/or reinforcement and/or stability to the layer and/or composite. Examples of useful filler components include, without limitation, wood, mica, talc, calcium carbonate, graphite or carbon, for example, in the form of particles, such as fibers, and the like and mixtures thereof. A filler component is particularly advantageous in the intermediate layer, while the inner layer and/or outer layer preferably and substantially free of filler component. Preferably, the filler component of the intermediate layer material comprises a wood component such as, but not limited to, wood particles, for example, wood shavings, wood chips, wood flour and the like and mixtures thereof. This use of a wood component advantageously provides an effective filler without unduly increasing the weight or cost of the composite.

The present invention further comprises methods of manufacturing layered composites. Advantageously, the composites in accordance with the invention can be produced using a single coextrusion process using a suitable feedblock, pipehead and forming or shaper die assembly. The methods, in accordance with the present invention, for producing such composites comprise providing the desired materials, in an extrudable state, for the outer layer, the intermediate layer and the inner layer, and passing the materials, by means of or through, three coextruders, into a feedblock assembly to produce a material form, for example and without limitation, having a radially layered cross-section shape, for example, a substantially solid circular axial cross-section. This material form is introduced to or passed through a forming or shaper die having a desired cross sectional shape and is reconfigured thereby to produce or form a layered composite or reshaped composite having a desired cross-section shape, for example, a square, elongated rectangle or any other desired cross-section shape.

Advantageously, the methods of the invention enable the production of layered slat members having surprisingly narrow cross-sections. Composites can be formed, e.g. cut, into different lengths and configurations to be useful as architectural, structural or interior design components, for example, window blind slats, siding components, such as residential siding components, commercial siding components and the like, molding components, paneling components, fencing and/or decking components, such as rails, posts, etc., and the like.

In another embodiment of the invention, a pipehead assembly is connected between the feedblock assembly and the shaper die. Thus, rather than a solid circular layered extrusion being passed to the shaper die, the extrusion is first fed through a pipehead assembly to form an annular layered extrusion. This annular layered extrusion is then passed through the shaper die wherein the extrusion is shaped. To form the substantially solid inner layer, the annular layers are collapsed and shaped to produce a composite having a substantially solid inner reinforcement member, for example, having a cross-section defined by a collapsed annulus. In some instances, depending on materials used and production parameters, the collapsed inner layer becomes fused together, such that the inner layer appears as a single solid layer through the center of the member.

In another embodiment, an inner layer can be extruded or formed at the same time the outer layer and intermediate layer are extruded or formed. The composite thus formed does not require the inner layer to be collapsed, as in the above-noted embodiment to form and shape the final layered product.

One or more of the intermediate layers and/or the inner layer can be foamed, as desired using suitable blowing agents, for example, conventional blowing agents, and processing techniques well known to those skilled in the art.

Any and all features described herein and combinations of such features are included within the scope of the present invention provided that the features of any such combination are not mutually inconsistent.

These and other features, aspects and advantages of the present invention will become apparent hereinafter, particularly when considered in conjunction with the following claims and detailed description in which like parts bear like reference numerals.

BRIEF DESCRIPTION OF THE DRAWINGS

FIGS. 1a-1e show various views of an embodiment of the invention having a substantially rectangular cross-section.

FIGS. 8 and 8a show two views of an alternate embodiment of the present invention useful as residential siding.

DETAILED DESCRIPTION

Figure 2A:
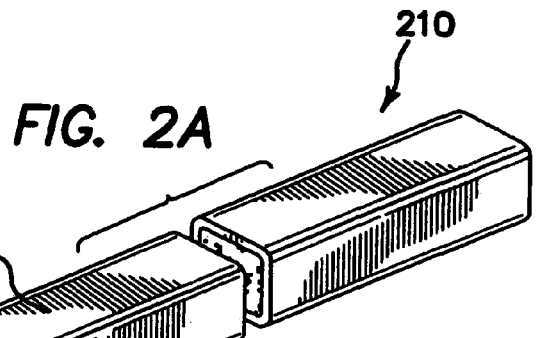
FIG. 2a-2e show various views of another embodiment of the invention having a substantially square cross-section.
Figure 2E:
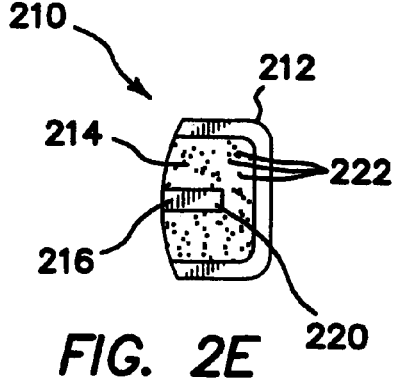
Figure 2B:
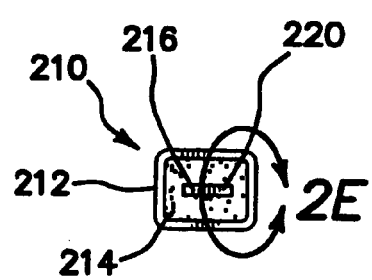
Figure 2C:
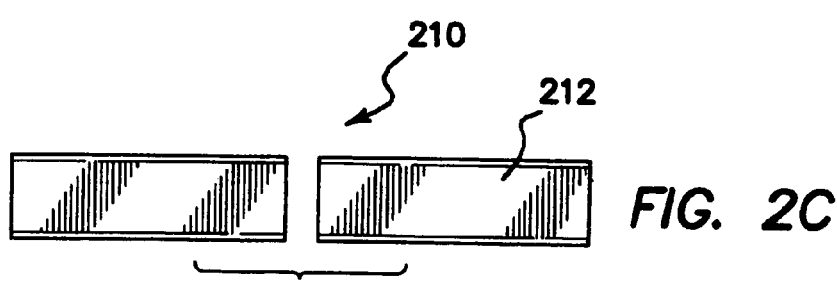
Figure 2D:
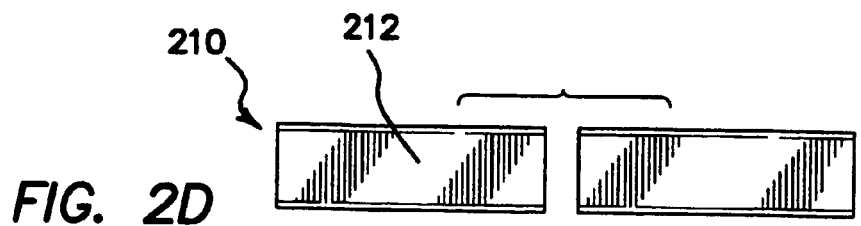
Figures 3A, 3B:
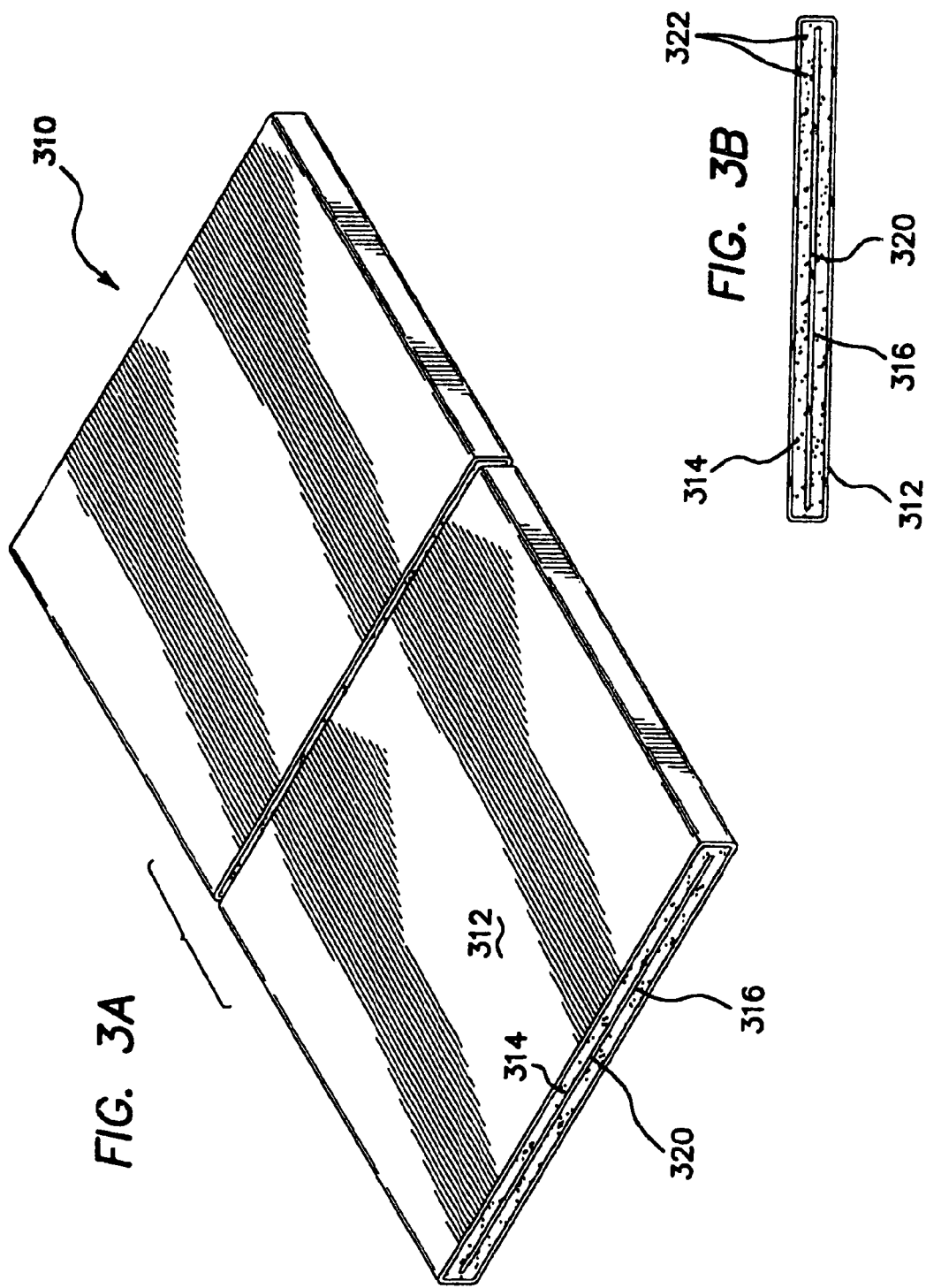
FIG. 3a-3d show various views of an embodiment of the invention useful as a component of a window covering blind.
Figure 3C:
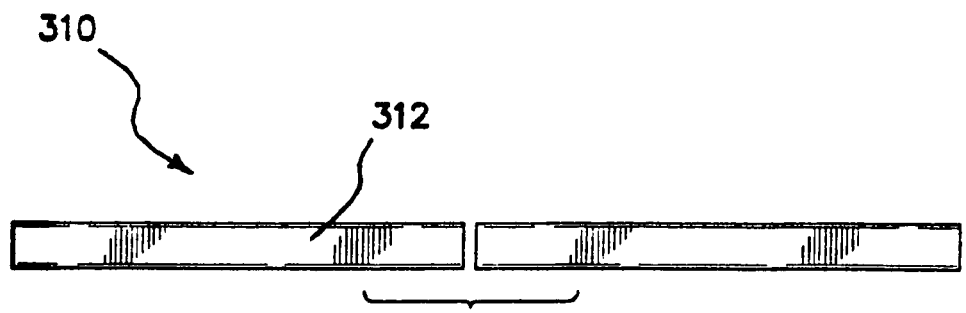
Figure 3D:
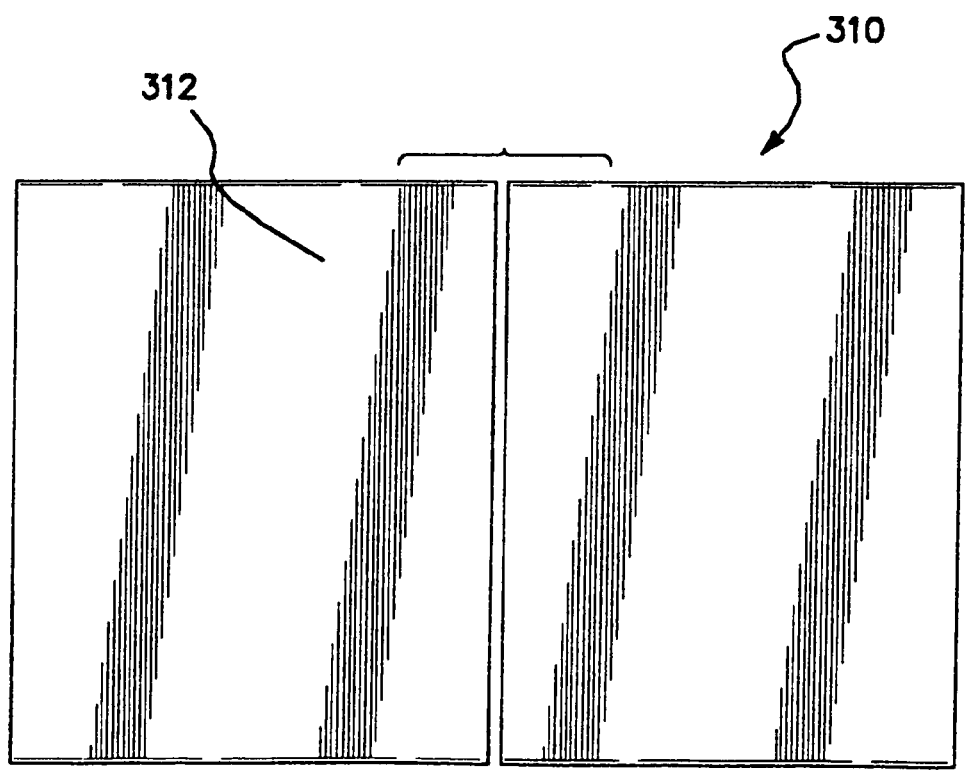

Turning now to FIGS. 1a-1e, 2a-2e, 3a-3d and 4a-4e, lightweight, durable, weatherable layered composites in accordance with the present invention are shown generally at 10, 210, 310 and 410. The present composites are useful as construction elements, for example, when assembled together with other similar composite members in accordance with the invention. For example, the present composites, such as composite 310, may be useful as light-weight, durable slats of vertical blinds or "Venetian" blind window covering. The present composites, such as composite 410, may be useful as strong, weatherable siding members for residential, commercial and industrial applications. In addition, the present composites, such as composites 10 and 310, may be useful as architectural molding members or as decking components, e.g., planks in complete decking systems. Further, the present composites, such as composite 210 and composite 10, may be useful as fence posts and/or fence rails in a complete fencing system. The shapes/configurations of the composites 10, 210, 310, 410 are shown for illustrative purposes. Many other shapes/configurations may be provided and are included in the scope of the present invention. In addition, the size, for example, the length, width and thickness or height of the composites of the present invention can be independently varied over wide ranges to comply with the requirements of the application in which the composite is to be used.

Turning to FIGS. 1a, 1b and 1e, a side 15 of the composite 10 is shown in cross section.

The composite 10 generally comprises a weatherable outer "skin" layer 12 comprising a first polymeric material, an intermediate layer 14 circumscribed by the outer layer 12 and comprising a second polymeric material, and an inner layer 16 circumscribed by the intermediate layer 14, and comprising a third polymeric material. In composite 10, the inner layer 16 defines a reinforcement element, for example, a substantially solid reinforcement element. Preferably, at least two of the first, second and third polymeric materials have different chemical compositions as will be described in detail hereinafter.

The composite 10 has a length along a longitudinal axis 17, from side 15 to opposing side 19, and the inner layer 16 extends along substantially the entire length of the composite 10.

Except as expressly described herein, each of the composites 210, 310 and 410 is structured substantially similarly to composite 10. Components of composites 210, 310 and 410 which correspond to components of composite 10 are identified by the same reference numeral increased by 200, 300 and 400, respectively.

The primary difference between composite 10 and composites 210, 310 and 410 is that each of these composites has a different shape or cross-section or cross-sectional shape.

The composites in accordance with the present invention may have any suitable length and any suitable cross-sectional shape perpendicular to the longitudinal axis. For example, FIGS. 1a-1e show composite 10 which has a substantially rectangular cross section.

FIGS. 2a-2e show composite 210 having a substantially square cross-section. FIG. 3a-3d show composite 310 having an elongated substantially rectangular cross-section. FIGS. 4a-4e show composite 410 having a modified or stepped substantially rectangular cross-section. The selected cross-sectional shape will depend upon the desired application of the composite. For example, the elongated or thin composite 310 is particularly useful as a slat of a window covering blind or as a decking component, whereas composite 410 is particularly useful as a residential or commercial building siding component.

Although not shown in detail, preferably the intermediate layer 14, 214, 314, 414 is circumscribed by the outer layer 12, 212, 312, 412 along substantially the entire length of the composite 10, 210, 310, 410, respectively. Also, the inner layer 16, 216, 316, 416 is circumscribed by the intermediate layer along substantially the entire length of the composite 10, 210, 310, 410, respectively.

As will be described hereinafter, composites 10, 210, 310, 410 preferably are formed using a single coextrusion process by introducing each of the first, second and third polymeric materials, in extrudable form, into a different extrusion pathway of a single extruder/feedblock assembly. Advantageously, the various layers of the composites 10, 210, 310, 410 are bonded together during the extrusion process, and thus are held together without the aid of glues, adhesives, bonding agents or the like. To this extent at least, the first, second and third polymeric materials can be said to be compatible. Put another way, the first, second and third polymeric materials preferably are selected to be effectively bonded together without the need of glues, adhesives, bonding agents and the like. During the extrusion process, the materials are concurrently passed through a shaper die assembly to achieve the desired cross-sectional configuration. The present composites preferably are substantially free of adhesion aids, such as glues, adhesives, bonding agents and the like, effective to bond or hold the various layers of the composites together.

The outer layer of the present composite may be comprised of any suitable polymeric material, such as one or more suitable thermoplastic polymeric materials.

Preferably, for example, for commercial and residential siding and other outdoor applications, the outer layer of the present composite, such as outer layers 12, 212, 312, 412 of the composites 10, 210, 310, 410, respectively, is comprised of a relatively thin layer of solid "weatherable" polymeric material. Suitable weatherable materials for the outer layer include, without limitation, weatherable thermoplastic polymeric materials, such as polyvinylchloride, acrylonitrile/styrene/acrylic ("ASA") polymeric materials and the like, and mixtures, combinations or alloys thereof. The presently useful ASA polymeric materials can be made using any suitable methodology. See, for example, Hughes U.S. Pat. No. 5,883,191; Yu et al U.S. Pat. No. 3,944,631; Aliberto et al. U.S. Pat. No. 4,517,339; Ting U.S. Pat. No. 4,731,414; Ting U.S. Pat. No. 4,831,079; and Moring a et al. U.S. Pat. No. 4,151,226. The disclosure of each of these patents is hereby incorporated in its entirety herein by reference. Such ASA polymeric materials may be physical blends or mixtures of styrene/acrylonitrile copolymers and acrylic polymers and copolymers; acrylonitrile/styrene/acrylic terpolymers, interpolymers including styrene-based units, acrylonitrile-based units and acrylic-based units, and the like and mixtures and combinations thereof.

The intermediate layer of the present composite, such as the intermediate layers 14, 214, 314, 414 of composites 10, 210, 310, 410, respectively, are comprised of the second polymeric material and preferably an effective amount of a filler component. Intermediate layers substantially free of filler components may also be employed and are included within the scope of the present invention. In one useful embodiment, the intermediate layers 14, 214, 314, 414 of the composites 10, 210, 310, 410, respectively, may include a wood component, for example, in the form of wood particles 22, 222, 322, 422, in an effective amount as a filler component. Such fillers may be, and preferably are, present in any of the composite members of the present invention.

The intermediate layer of the present composite, such as the intermediate layers 14, 214, 314, 414 of components 10, 210, 310, 410, respectively, may comprise any suitable second polymeric material, such as a polymeric material selected from, for example, without limitation, polyvinylchloride, acrylonitrile/styrene acrylic (ASA) polymeric materials, acrylonitrile/butadiene/styrene ("ABS") polymeric materials, and mixtures, combinations and alloys thereof. As noted above, the intermediate layers of the present composites preferably include a filler component, preferably a wood component, in an amount effective as a filler in the intermediate layer of the composite. Suitable ASA/filler component compositions and methods for making such compositions are described in Hughes, U.S. Pat. No. 6,133,349, the disclosure of which is incorporated in its entirety herein by reference.

The intermediate layer of the present composites, such as intermediate layers 14, 214, 314, 414 of composites 10, 210, 310, 410, respectively, may be solid or comprised of a polymeric foam material or a foamed polymeric material, for example, which forms a cellular structure that bonds with the outer layer and the inner layer of the present composites. The intermediate layer preferably comprises a polymeric foam material or a foamed polymeric material. The second polymeric material, preferably a polymeric foam material, is present in the intermediate layer of the present composite in an amount in the range of about 15% to about 90% or about 95% or about 99.5% of the total weight of the intermediate layer. The filler component, if any, preferably is present in the intermediate layer in an amount in the range of about 0.5% or about 5% or about 10% to about 60% or about 70% or about 85% based on total weight of the intermediate layer.

Although the filler component of the intermediate layer material preferably comprises wood, for example, without limitation, wood particles, it is to be appreciated that other fillers may be included as alternatives or in addition to the wood component. For example, the filler component may comprise carbon fibers, organic materials or other known filler materials. Wood is a preferred filler component because it is lightweight, strong, readily obtainable, and relatively inexpensive.

The outer, intermediate and inner layers of the present composites may contain effective amounts of one or more additional agents, such as pigments, processing aides, lubricants, antioxidants and stabilizers, for example, ultraviolet light and thermal stabilizers, and the like.

Although the wood component may be present in any suitable form, it is preferred that the wood be present as wood particles, such as wood chips, wood flakes, sawdust, wood flour, and the like and mixtures thereof. More preferably, such particles have a size in the range of about 40 to about 200 U.S. mesh, still more preferably, about 50 to about 150 U.S. mesh.

Very useful results are obtained with the wood component being selected from pine wood, woods softer then pine wood, such as fir wood and the like, and mixtures thereof. The wood component may also include a wood which is harder than pine wood, such as oak wood, walnut wood, hickory wood, maple wood and the like and mixtures thereof. One very useful combination is a wood component which includes a first wood at least as soft as pine wood and a second wood harder than pine wood. In this embodiment, the first wood preferably is present as a major amount, that is at least 50% of the total wood present, while the relatively hard wood is present in a minor amount, that is less than 50% of the total wood present. The wood component may, and preferably does, act to reinforce the present compositions.

In one very useful embodiment, the first polymeric material included in the outer layer and/or the second polymeric material included in the intermediate layer is produced using straightforward physical mixing or blending methods, and without one or more complex polymerization steps being required. This is particularly useful when the first polymeric material and/or the second polymeric material is or includes an ASA polymeric material. Control of the make-up and physical properties of such physically blended ASA polymeric material is more easily achieved than with compositions involving one or more polymerizations. Suitable physical blending methods are described in Hughes U.S. Pat. No. 5,883,191.

In one embodiment of the present invention, the intermediate layer 14, 214, 314, 414 of composite 10, 210, 310, 410, respectively, comprises a composition of a substantially uniform blend of an uncrossed-linked acrylonitrile/styrene copolymer, for example, a linear uncross-linked acrylonitrile/styrene copolymer, an acrylate copolymer, such as a cross-linked alkyl acrylate/graft (meth)acrylate copolymer, and filler, for example, wood particles.

In a particularly useful embodiment of the present invention, the wood-filled compositions forming the intermediate layer 14, 214, 314, 414 of composite 10, 210, 310, 410, respectively, include an increased amount of lubricant relative to the amount of lubricant included in a similar composition without the filler, e.g., wood. Such increased amount of lubricant is effective in facilitating forming a substantially uniform physical blend of the components of the composition, particularly, since the filler, e.g., wood, being employed is often relatively dry and/or relatively incompatible with the copolymer components of the compositions. The amount of lubricant used preferably increases as the amount of filler particles increases. The amount of lubricant used may vary widely depending on the specific lubricant employed. The amount of lubricant employed may be in a range of about 0.1% or about 0.5% to about 2% or about 5%, by weight of the total composition.

Methods for forming a wood-filled composition useful in the present composites, comprise providing an uncross-linked acrylonitrile/styrene copolymer; providing a cross-linked alkyl acrylate/graft (meth)acrylate copolymer; providing filler component particles and forming a substantially uniform physical blend of these two copolymers and the filler particles. This physical blend preferably is substantially free of cross-linked acrylonitrile/styrene copolymer.

The substantially uniform blend formed preferably includes at least about 30% by weight, based on the total weight of the copolymers present, of the uncross-linked acrylonitrile/styrene copolymer and at least about 5% by weight, based on the total weight of the copolymers present, of the cross-linked alkyl acrylate/graft (meth)acrylate copolymer and an amount of filler component particles effective as a filler in the final composition. More preferably, the uncross-linked acrylonitrile/styrene copolymer is present in an amount in a range of about 30% to about 95% by weight based on the total weight of the copolymer and the cross-linked alkyl acrylate/graft (meth)acrylate copolymer is present in an amount in a range of about 5% to about 70% by weight based on the total weight of the copolymers. It is preferred that, during the forming step, substantially no polymerization occurs. It is also preferred that, after polymerization, the intermediate layer comprises a lightweight closed-celled structure.

The inner layer 16, 216, 316, 416 of composite 10, 210, 310, 410, respectively, which forms the generally centrally located reinforcement element 20, 220, 320, 420, can be made of any suitable polymeric material, for example, thermoplastic polymeric material. Preferably inner layer 16, 216, 316, 416 is a solid thermoplastic material which, like intermediate layer 14, 214, 314, 414, does not need to be weatherable. Preferably, the third polymeric material included in the inner layer 16, 216, 316, 416 is effectively impact resistant, that is has a high impact resistance, and/or has a high modulus of rigidity, for providing reinforced and/or enhanced strength/rigidity to the composite member 10, 210, 310, 410 during packaging, assembly and/or use. The reinforcement and enhanced strength/rigidity of the present composite members are relative to substantially identical composite members without the inner layers or reinforcement elements.

Examples of polymeric materials that are useful for inclusion in the inner layer 16, 216, 316, 416 include, without limitation, polyvinylchloride, acrylonitrile/butadiene/styrene polymeric materials, and the like and mixtures, alloys or combinations thereof. The inner layer materials may include a filler component, for example, as described elsewhere herein, to provide increased reinforcement and/or an increased or high modulus of rigidity to the composite member 10, 210, 310, 410, relative to an identical composite without an inner layer including a filler component.

Figure 5:
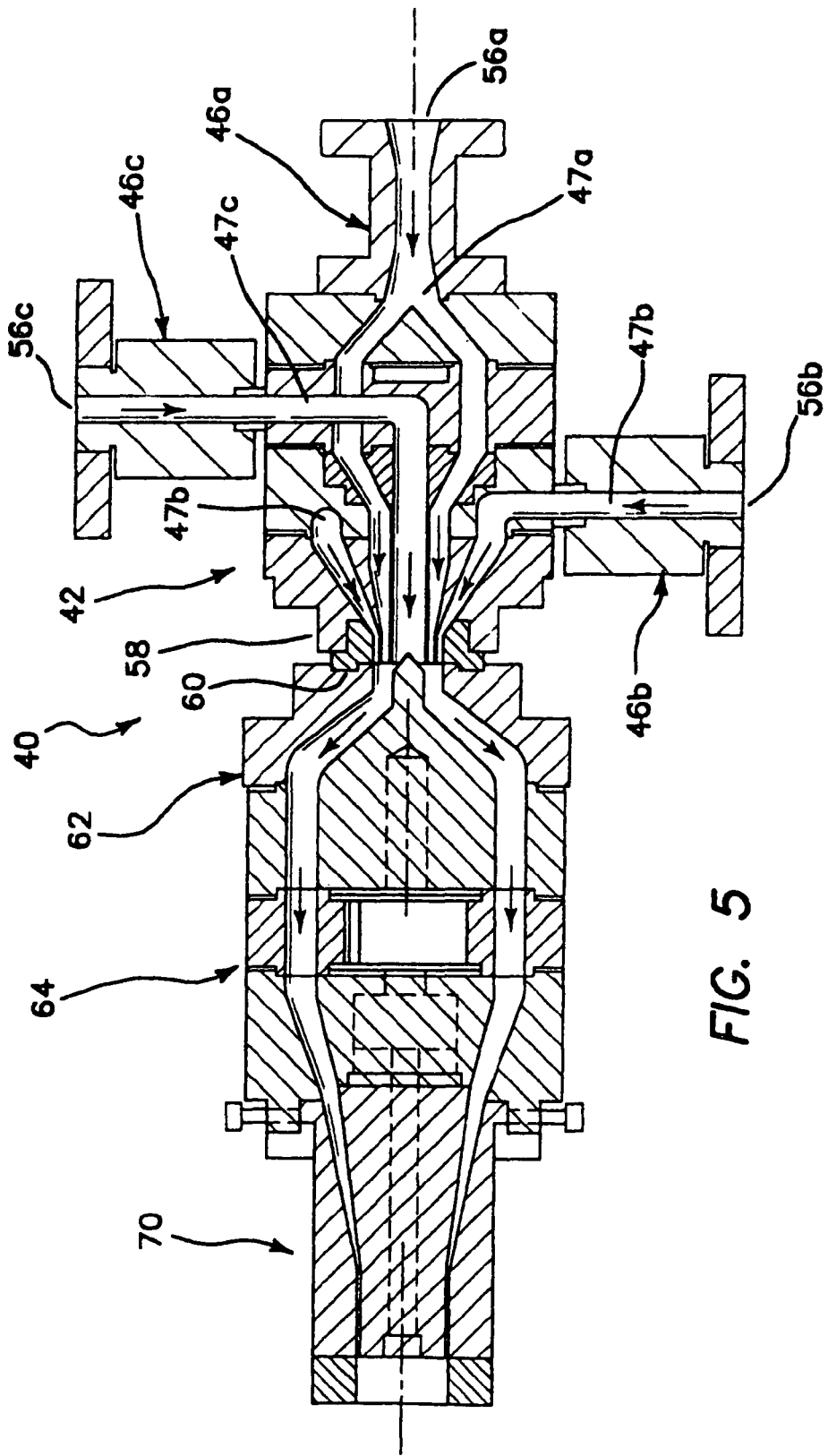
FIG. 5 shows a cross-sectional view of apparatus suitable for producing some of the composites of the invention.

Referring now to FIG. 5, the composite 10, 210, 310, 410 (composite not shown in FIG. 5) can be produced using coextrusion techniques. Useful coextrusion assemblies for producing a layered, extruded composite having a radially stratified annular form are disclosed in Rosenbaum U.S. Pat. Nos. 4,125,585 and 4,208,175, the disclosure of both of which are incorporated herein in their entireties by reference.

For example, as shown schematically in FIG. 5, a single extruder/feedblock/pipehead assembly 40, comprising a coextrusion feedblock 42 adapted to be fed by three extruders 46a, 46b, 46c is shown. Each extruder 46a, 46b, 46c defines a separate extruder pathway 47a, 47b, and 47c, respectively. Each of the compositions (i.e. the first polymeric material, second polymeric material and third polymeric material) is introduced into a different one of the extruder pathways 47a, 47b, and 47c and extruded to yield a radially layered, substantially circular cylindrical form. This form is then passed directly to a shaper assembly and reshaped to a desired axial cross section and cut to a desired length.

In some embodiments, the annular form is collapsed about a central hollow thereof, yielding a substantially solid, e.g., no central open or hollow space, layered form having an inner layer with a cross-section defined by a collapsed annulus. This shaping and collapsing of the initially cylindrical form occurs, for example, while the form passes through the shaper assembly. Although defining a collapsed annular form within the shaper assembly, the inner layer often fuses or adheres together to form a substantially solid one-layered structure without the appearance of a collapsed annulus.

Alternatively, each of the first, second and third polymeric materials, in extrudable form, is passed from the extruder directly to the shaper assembly without being passed through a pipehead die. In this manner, the extrusion does not assume a layered annular form prior to being shaped.

More specifically, in accordance with one embodiment of the invention, the wood-filled intermediate layer material, preferably along with a conventional polymeric material blowing agent, such as sodium bicarbonate, azodicarbonamide and the like, is fed into inlet 56a of first extruder 46a. The outer layer material and the inner layer material are fed into coextruder inlets 56b and 56c, respectively. The coextrusion feedblock 42 is operable to produce a circular cylindrical form of inner layer material, intermediate layer material and outer layer material at zone 58. This cylindrical form is fed directly into an inlet 60 of a pipehead forming die 62, connected to the feedblock 42, as shown in FIG. 5. The assembly 40 produces an annular, or pipe-shaped form of the outer, intermediate and inner layer materials at zone 64 which is substantially free of radial and circumferential maldistributions.

The cylindrical form is then passed through another forming die, or shaping die 70 connected to the pipehead die 62, which shapes the form to produce a composite of indefinite length having the desired axial cross-sectional shape, as discussed elsewhere herein.

While in the shaper die, the intermediate layer material, comprising a blowing agent, is allowed to foam and expand within the constrains of the shaper die. This causes the inner layer material having an annular form at this point in the extrusion process, to collapse, thus taking on the cross-sectional shape generally, of a collapsed annulus. The inner layer 16, 216, 316, 416 of composite 10, 210, 310, 410, respectively, in this embodiment has a cross-sectional shape of a collapsed annulus.

In another embodiment of the invention, the composite 10, 210, 310, 410 is produced through a single co-extrusion process without the use of the pipehead die 62 described elsewhere herein. In other words, in this particular embodiment of the invention, the shaping die 70 is directly connected to the coextrusion feedblock 42. The cylindrical layered form extruded from the feedblock is fed directly to the shaping die 70.

The shaped form extruded from the shaper die 70 is then cut to a length suitable for the desired application. The cut portion may be capped with any suitable capping material. The composite may be produced to have wall or layer thicknesses suitable for the desired application. These thicknesses can vary widely.

For a typical application, the composite member 10, 210, 310, 410 preferably has a composite wall thickness (radial thickness) in a range of about 0.06 inches to about 1.7 inches, for example, a thickness of about 0.1 inches to about 0.6 inches. The intermediate layer 14, 214, 314, 414 preferably has a thickness (radical thickness) in a range of about 0.04 inches to about 0.9 inches, and the outer layer and the inner layer each, independently, preferably has a thickness (radical thickness) in a range of about 0.01 inches to about 0.4 or about 0.7 inches.

Turning now to FIG. 3a-3d, composite 310 useful as a window blind slat is shown. The composite 310 may comprise either two layers (not shown) or three layers, 312, 314 and 316. As a specific example of a window blind slat in accordance with the invention, the thickness of the composite 310 is, for example, between about 0.10 inch to about 0.14 inch or about 0.2 inch and has a width between about 1 or about 1.5 inches to about 2 or about 2.5 inches. The outer layer 312 of composite 310 has a thickness of between about 0.005 inch to about 0.015 inch and the inner layer 316 has a thickness of between about 0.020 inch to about 0.040 inch.

The two layer embodiment (not shown) is without a weatherable capping or outer layer and generally comprises an inner layer or reinforcement element (similar to inner layer 16, 216, 316, 416 of composite 10, 210, 310, 410, respectively) and a foam layer (similar to intermediate layer 14, 214, 314, and 414 of composite 10, 210, 310, 410, respectively) circumscribing the inner layer reinforcement element. In this embodiment, the outer foam layer may comprise polystyrene, ABS, ASA, polyvinylchloride, and the like, and preferably is without a filler component, for example, a wood filler.

The window blind slat, such as composite 310, preferably is produced by coextrusion techniques without use of a pipehead, such that the inner reinforcement element 316 is a single layer, as described elsewhere herein.

A tri-layer composite 410 in accordance with the invention, useful as a siding component, is shown in FIGS. 4a-4e. For purposes of example only, the siding member is about 0.2 or about 0.3 to about 0.35 or about 0.4, for example, about 0.335, inch thick and includes an outer layer 412 of between about 0.02 or about 0.025 to about 0.035 or about 0.04 inch thick, an intermediate foam layer 414 of between about 0.2 or about 0.260 to about 0.280 or about 0.35 inch thick, and an inner layer 416 of between about 0.02 or about 0.03 to about 0.04 or about 0.05 inch thick.

Figure 4A:
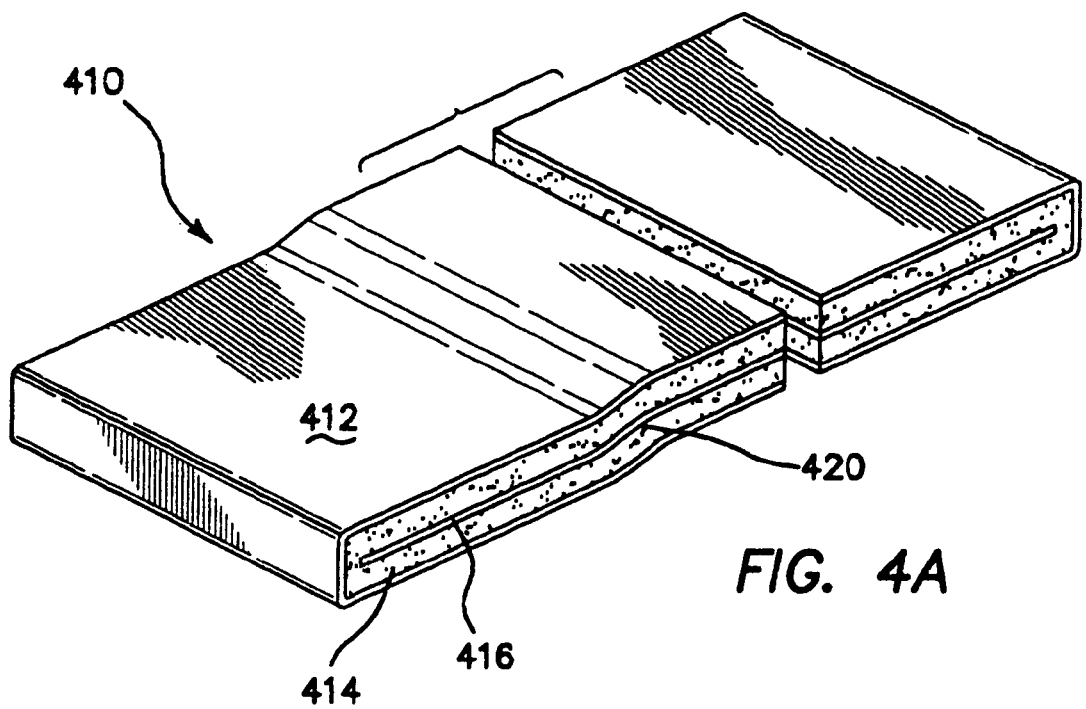
FIG. 4a-4e show various views of an embodiment of the invention useful as residential siding.
Figure 4B:
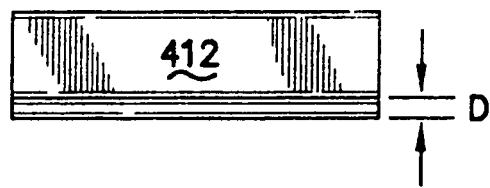
Figure 4E:
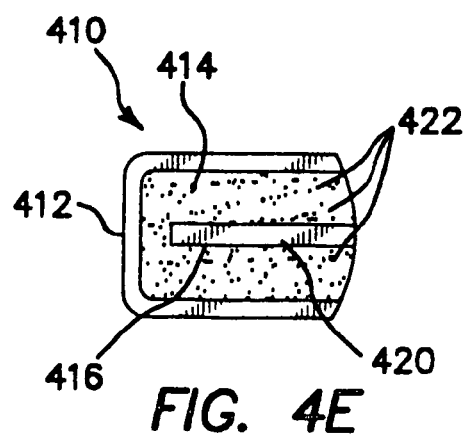
Figure 4C:
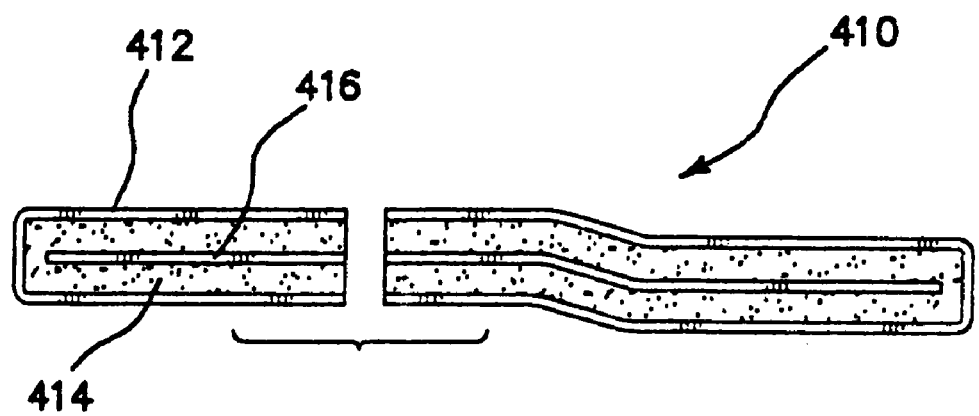
Figure 4D:
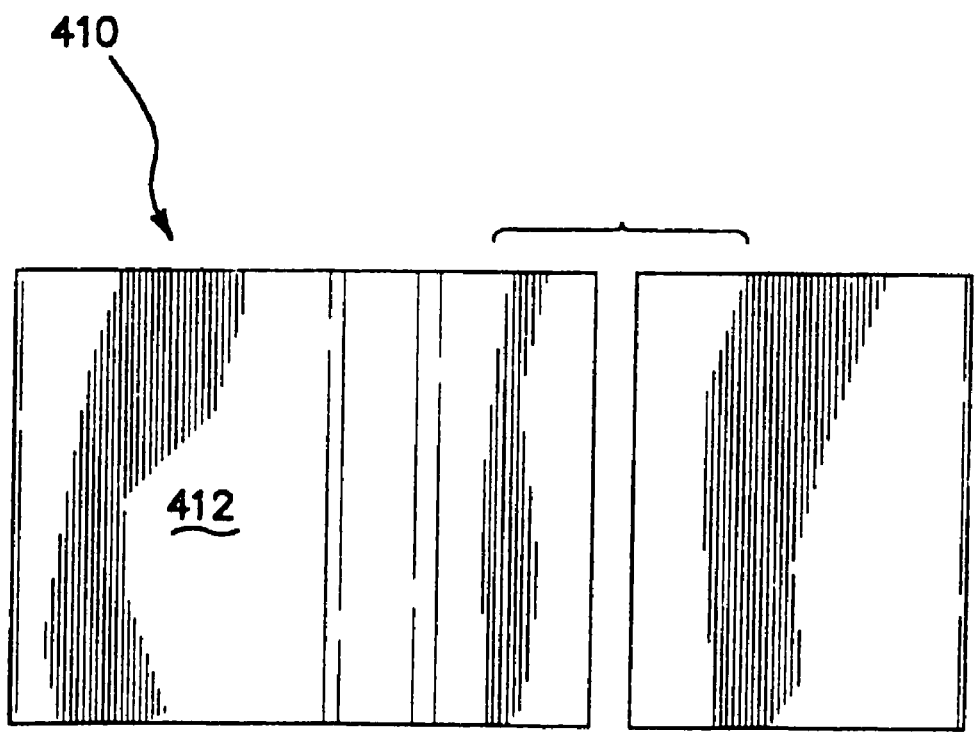

As shown most clearly in FIGS. 4a, 4b and 4c, the composite member 410 has a modified rectangular cross-section, with a dip D, for example, of between about 0.04 to about 0.05 inch, such as about 0.045 inch.

A process for manufacturing a layered composite is also provided by the present invention. The process generally comprises the steps of providing the materials described hereinabove, in flowable or extrudable form, and forming a cylindrical flow of the materials, reshaping the cylindrical flow into a desired cross sectional shape to achieve a composite having substantially uniform layers including a substantially solid reinforcement element, and cutting the reshaped flow into a desired length.

For example, the forming step includes introducing the materials, which will make up the outer layer and inner layer, and the wood-filled material which will make up the intermediate layer, into an extruder assembly while the materials are in an extrudable form. For example, the materials may be subjected to elevated temperatures and/or pressures prior to being introduced into the extruder assembly.

The wood-filled thermoplastic polymeric material to be included in the intermediate layer is provided in an extrudable form by subjecting a mixture of, for example, acrylonitrile/styrene/acrylic polymeric material and wood particles, to conditions effective to produce a substantially uniform, flowable or extrudable composition. Such conditions are described in detail in Hughes U.S. Pat. No. 6,133,349, and can generally include for example, elevated temperature conditions, elevated pressure conditions, shear or mixing conditions and combinations thereof. The substantially uniform composition is then introduced in a coextrusion assembly such as described elsewhere herein, along with the outer layer and inner layer materials, and formed by suitable connecting shapers or dies, into useful shapes and configurations.

It is preferable that, during the forming step, substantially no polymerization occurs.

The composite can be subjected to any post-processing steps, such as texturing, painting and the like as may be desirable. Advantageously, the layered composites in accordance with the present invention do not require any mechanical means to secure the layers together. The coextrusion process described hereinabove causes the layers to bond together without the aid of adhesives, glue, bonding agents or the like.

Figure 6:
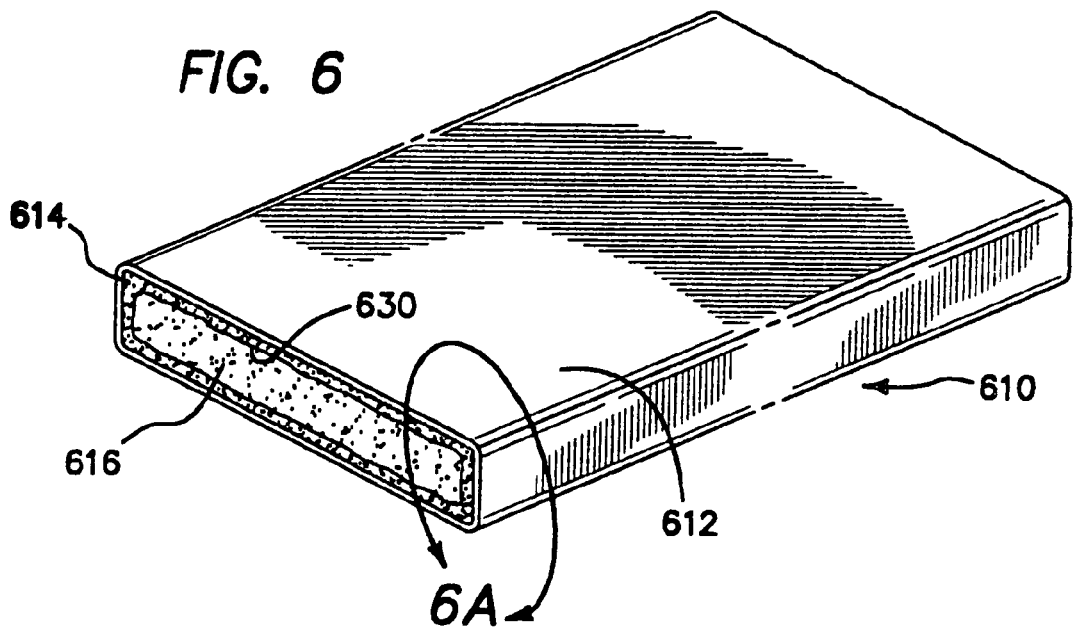
FIGS. 6 and 6a show two views of an alternate embodiment of the invention having a substantial rectangular cross-section.
Figure 6A:
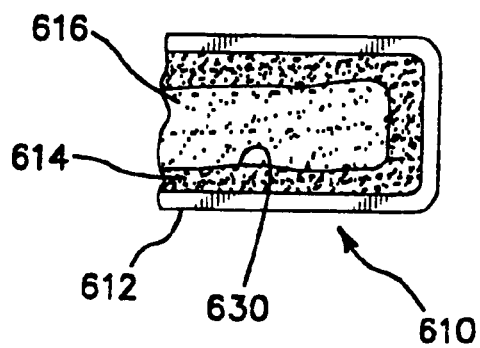

Turning now to FIGS. 6 and 6a, an alternate embodiment of the present composites, shown generally as composite 610, includes an outer weatherable layer 612, an intermediate foam layer 614 and an inner foam layer 616.

The weatherable outer layer 612 is substantially similar to the weatherable outer or Askin@ layer 12, 212, 312, 412 of composites 10, 210, 310, 410, respectively, as described elsewhere herein. In addition, the intermediate foam layer 614 is substantially similar in chemical composition to the polymeric foam material in the intermediate layer 14, 214, 314, 414 of composites 10, 210, 310, 410, respectively, as described elsewhere herein. Intermediate foam layer 614 preferably includes a filler component, for example, a wood component, in the proportions as outlined elsewhere herein.

The inner foam layer 616 of composite 610 is a foamed polymeric layer which, together with the intermediate foam layer 614, is effective to reinforce or strengthen the composite 610 relative to an identical composite without the inner foam layer 616. A third polymeric material, such as previously described with regard to inner layers 16, 216, 316, 416 of composites 10, 210, 310, 410, respectively, may be included in inner foam layer 616. The inner layer 616 may include an effective amount of a filler component, for example, a wood component, to provide an increased modulus of rigidity to the composite 610. The inner layer 616 may be formed by providing the third polymeric material included in the inner layer with an effective amount of a blowing agent, for example, a conventional blowing agent such as sodium bicarbonate, azodicarbonamide and the like.

This third polymeric material, together with the first polymeric material and the second polymeric material, is provided to a coextrusion process, similar to that described elsewhere herein, to produce the composite 610. Because the inner layer 616 includes a foamed polymeric material, the coextrusion system used does not include a pipehead. Both intermediate foam layer 614 and inner foam layer 616 are allowed to form by foaming and expanding in a shaper die, within the constraints of the shaper die. It should be noted that inner layer 616 may be foamed and not include a filler component.

Figure 7A:
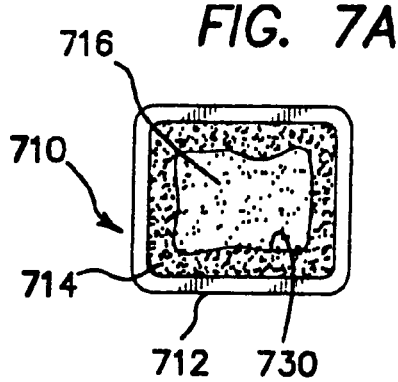
FIGS. 7 and 7a show two views of an alternate embodiment of the invention having a substantially square configuration.

FIG. 7a shows a similar alternate embodiment of a composite, shown generally as 710, having an outer layer 712 in intermediate foam layer 714 and an inner foam layer 716. The cross section of the composite 710 is generally in the form of a square. This is in contrast to the composite 610, shown in FIG. 6, which 610 has a generally elongated rectangular cross section.

FIG. 8 shows a further similar alternate embodiment of a composite, shown generally at 810, in the form of a residential siding component, for example, for applications similar to that described with regards to the composite 410 of FIGS. 4a, 4b, 4c, 4d and 4e. With regard to composite 810, outer layer 812, intermediate foam layer 814 and inner foam layer 816 are included.

Intermediate foam layers 714 and 814 are similar in composition and function to intermediate foam layer 614. Inner foam layers 716 and 816 are similar in composition and function to inner foam layer 616. Composites 710 and 810 can be made substantially similarly to how composite 610 is made.

Figure 7:
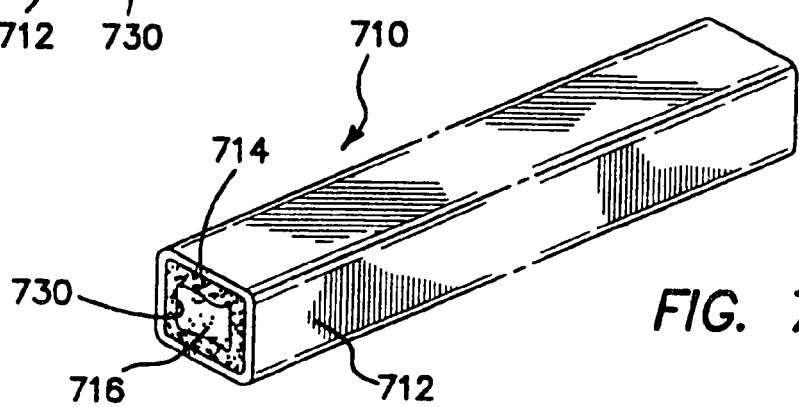

One very useful feature of the alternate embodiments shown in FIGS. 6, 7 and 8 has to do with the relatively uneven or irregular interface 630, 730, 830 of composites 610, 710, 810, respectively. The layering of the composites 610, 710, 810, as well as the layering of the other composites described elsewhere herein, is effective to provide for reinforcement or added strength to the composites. In addition, the relatively irregular configuration of the interface 630, 730, 830 between the intermediate foam layer 614, 714, 814 and the inner foam layer 616, 716, 816, respectively, provides additional reinforcement or strength to the composites 610, 710, 810.

Thus, it has been found that the composites 610, 710, 810, including two foam layers, are not only relatively light weight compared to the composites 10, 210, 310, 410 described herein which include a solid inner layer, but also have a sufficient amount of strength so as to be effective in many, if not all, of the applications described elsewhere herein. Thus, the present composites 610, 710, 810 including two foam layers have an important combination of advantages in being both lightweight and sufficiently strong so as to the satisfy the needs of various applications for the use of such composites.

While this invention has been described with respect to various specific examples and embodiments, it is to be understood that the invention is not limited thereto and that it can be variously practiced within the scope of the following claims.

What is claimed is:

1. A method for producing a composite comprising a construction element having a length, a substantially non-hollow cross section perpendicular to the length, an outer weatherable layer, an intermediate layer and an inner layer, the method comprising the steps of:
   providing, in extrudable form, (1) a first composition comprising a first weatherable polymeric material, (2) a second composition comprising a second polymeric material, and (3) a third composition comprising a third polymeric material,
   introducing each of the compositions into a different extrusion pathway of a single extruder/feedblock/pipehead assembly adapted to be fed by three co-extruders, wherein the extrusion pathways of the first, second and third polymeric materials are arranged such that, in cross section, the third polymeric material is circumscribed by the second polymeric material, and the second polymeric material is circumscribed by the first polymeric material;
   extruding the compositions to produce an annular form, wherein the extruder/feedblock/pipehead assembly is arranged to produce said annular form through a convergent flow pathway;
   introducing the annular form into a forming/shaper die having a desired cross sectional shape; to produce a reshaped form wherein the annular form is collapsed about a central hollow to form a substantially non-hollow, layered form, and
   cutting the reshaped form into a desired length,
   wherein the composite thus formed comprises a rigid construction element having said length, a substantially non-hollow cross-section perpendicular to the length, an outer weatherable layer, an intermediate layer and an inner layer.

2. The method of claim 1 further comprising causing the formation of an intermediate foam containing the second polymeric material, and an inner foam containing the third polymeric material.

3. The method of claim 1 wherein the first and second polymeric materials are different.

4. The method of claim 1 wherein the second and third polymeric materials are different.

5. The method of claim 1 wherein the first and third polymeric materials are different.

6. The method of claim 1 wherein each of the first, second and third polymeric materials is different.

7. The method of claim 1 wherein the composite is extruded in the shape of a board.

8. The method of claim 1 wherein the composite is extruded in the shape of a slat.

9. The method of claim 8 wherein the composite is extruded in the shape of a window covering slat.

10. The method of claim 8 wherein the composite is extruded in the shape of a siding component.

11. The method of claim 1 wherein the composite is extruded in the shape of a paneling component.

12. The method of claim 1 wherein the composite is extruded in the shape of a fence component.

13. The method of claim 1 wherein the composite is structured to be useful as a component selected from the group consisting of a window blind component, a siding component, a molding component, a paneling component, a fencing component, and a decking component.

* * * * *